(12) United States Patent
Zhao et al.

(10) Patent No.: US 12,396,558 B2
(45) Date of Patent: Aug. 26, 2025

(54) NARROW BACKREST ELECTRIC SEAT MECHANICAL EXTENSION DEVICE

(71) Applicant: Emomo Technology (Zhejiang) Co., Ltd., Huzhou (CN)

(72) Inventors: Yushu Zhao, Huzhou (CN); Wencai Li, Huzhou (CN); Kai Jin, Huzhou (CN)

(73) Assignee: Emomo Technology (Zhejiang) Co., Ltd., Huzhou (CN)

( * ) Notice: Subject to any disclaimer, the term of this patent is extended or adjusted under 35 U.S.C. 154(b) by 219 days.

(21) Appl. No.: 18/380,194

(22) Filed: Oct. 15, 2023

(65) Prior Publication Data

US 2024/0389752 A1 Nov. 28, 2024

(30) Foreign Application Priority Data

May 25, 2023 (CN) .......................... 202310595324.3

(51) Int. Cl.
| | |
|---|---|
| A47C 1/034 | (2006.01) |
| A47C 1/035 | (2006.01) |
| A47C 1/0355 | (2013.01) |
| A47C 3/02 | (2006.01) |
| A47C 3/027 | (2006.01) |
| A47C 1/12 | (2006.01) |

(52) U.S. Cl.
CPC .............. *A47C 1/0355* (2013.01); *A47C 1/12* (2013.01)

(58) Field of Classification Search
CPC .............. A47C 1/0355; A47C 1/03211; A47C 1/03255; A47C 1/0345; A47C 1/03277
USPC .............................. 297/84, 85 R, 85 M, 259.2
See application file for complete search history.

(56) References Cited

U.S. PATENT DOCUMENTS

| | | | | |
|---|---|---|---|---|
| 7,445,279 | B2* | 11/2008 | Crum .................... | A47C 1/0355 297/69 |
| 7,497,512 | B2* | 3/2009 | White .................. | A47C 1/0355 297/89 |
| 8,016,348 | B2* | 9/2011 | Hoffman ............... | A47C 3/0255 297/85 M |
| 8,297,693 | B2* | 10/2012 | Hoffman ............... | A47C 3/0255 297/85 M |
| 8,398,165 | B2* | 3/2013 | Lawson ................. | A47C 3/027 297/259.2 |

(Continued)

FOREIGN PATENT DOCUMENTS

CN 106263778 A 1/2017

*Primary Examiner* — Shin H Kim
(74) *Attorney, Agent, or Firm* — Bayramoglu Law Offices LLC (57) ABSTRACT

A narrow backrest electric seat mechanical extension device is provided, which comprises mechanical extension units, a rear driving piece and a front drive piece, wherein each mechanical extension unit comprises a leg assembly, a back assembly and a seat panel, the back assembly is provided with an eleventh connector, a front support piece, a tenth connector, a ninth connector, an eighth connector, a seventh connector, a sixth connector, a fifth connector, a fourth connector, a third connector, a second connector, a first connector, a backrest support plate, a backrest fixing plate, a rear supporting piece and a backrest return spring, the driving device is hinged with the rear drive piece, and the rear drive piece is fixed with the sixth connector; the driving device is hinged with the front drive piece, and the front drive piece is connected to the leg assembly.

9 Claims, 7 Drawing Sheets

(56) References Cited

U.S. PATENT DOCUMENTS

| | | | | |
|---|---|---|---|---|
| 8,449,027 | B2* | 5/2013 | Wiecek | A47C 1/031 |
| | | | | 297/75 |
| 8,757,712 | B2* | 6/2014 | Wiecek | A47C 3/02 |
| | | | | 297/75 |
| 10,842,274 | B1* | 11/2020 | Crawford | A47C 1/0345 |
| 11,452,378 | B1* | 9/2022 | Li | A47C 1/03211 |
| 11,564,498 | B1* | 1/2023 | Li | A47C 17/04 |
| 11,638,482 | B2* | 5/2023 | Murphy | A47C 1/0355 |
| | | | | 297/85 R |
| 11,744,368 | B2* | 9/2023 | Li | A47C 1/0355 |
| | | | | 297/84 |
| 2001/0035668 | A1* | 11/2001 | Gaffney | A61G 5/14 |
| | | | | 297/85 M |
| 2008/0111402 | A1* | 5/2008 | Crum | A47C 1/0355 |
| | | | | 297/85 R |
| 2010/0127555 | A1* | 5/2010 | Hoffman | A47C 3/0255 |
| | | | | 297/344.21 |
| 2010/0127556 | A1* | 5/2010 | Hoffman | A47C 1/0355 |
| | | | | 297/84 |
| 2011/0175404 | A1* | 7/2011 | Lawson | A47C 3/027 |
| | | | | 297/83 |
| 2011/0233972 | A1* | 9/2011 | Weicek | A47C 3/02 |
| | | | | 297/84 |
| 2012/0119547 | A1* | 5/2012 | Hoffman | A47C 3/0255 |
| | | | | 297/84 |
| 2013/0257111 | A1* | 10/2013 | Wiecek | A47C 1/0342 |
| | | | | 297/383 |
| 2022/0361674 | A1* | 11/2022 | Li | A47C 1/0352 |
| 2023/0255355 | A1* | 8/2023 | Murphy | A47C 1/0355 |
| | | | | 297/85 R |
| 2024/0130532 | A1* | 4/2024 | Li | A47C 1/0347 |
| 2024/0172876 | A1* | 5/2024 | Li | A47C 17/163 |
| 2025/0000260 | A1* | 1/2025 | Cai | A47C 1/0355 |

\* cited by examiner

NARROW BACKREST ELECTRIC SEAT MECHANICAL EXTENSION DEVICE

CROSS REFERENCE TO THE RELATED APPLICATIONS

This application is based upon and claims priority to Chinese Patent Application No. 202310595324.3, filed on May 25, 2023, the entire contents of which are incorporated herein by reference.

TECHNICAL FIELD

The application relates to a narrow backrest electric seat mechanical extension device which is mainly suitable for posture-adjustable electric seats, in particular to the posture adjustment and main action component framework support of theater seats.

BACKGROUND

The main defects of the existing product are that the front and back directions of the backrest occupy relatively large space, so that the seat depth of the whole seat in the front and back directions is influenced, the comfort of a user is influenced, or the occupied space of the seat in use is relatively increased, the seat depth is relatively large under the condition that the use space in the front and back directions of the seat is not increased, and the user is relatively comfortable. Referring to a reference document having publication No. CN 106263778A, entitled "mechanical extension device and seat unit including the same", a back assembly thereof occupies a large space in the front-rear direction, and in a case where the space in the front-rear direction of the seat is limited as a whole, the seat depth of the seat is relatively reduced. The two sides of the comparison file roll by adopting the symmetrical rollers, so that the phenomenon of shaking and unbalance can occur to the motor drive in the transformation process of the functional seat between the state where the leg assembly are open and the backrest is not open and the lying state, the transformation process between the state where the leg assembly are open and the backrest is not open and the lying state is unstable, and the comfort level of the sofa is reduced.

SUMMARY

The technical problem solved by the present application is to overcome the above-mentioned deficiencies in the prior art, and provide a narrow backrest electric seat mechanical extension device which can relatively increase the seat depth without increasing the usage space of the seat in the front-rear direction and has a stable conversion process between the state where the leg assembly are open and the backrest is not open and the lying state.

The technical scheme adopted by the application for solving the technical problems is as follows: a narrow backrest electric seat mechanical extension device comprises two mechanical extension units which are arranged in bilateral symmetry, a back drive piece and a front drive piece, each mechanical extension unit comprises a leg assembly, a back assembly and a seat panel, and is characterized in that the back assembly is provided with an eleventh connector, a front support piece, a tenth connector, a ninth connector, an eighth connector, a seventh connector, a sixth connector, a fifth connector, a fourth connector, a third connector, a second connector, a first connector, a backrest support plate, a backrest fixing plate, a back support piece and a backrest return spring, the backrest fixing plate is fixedly connected to the seat panel, the backrest support plate is hinged with the backrest fixing plate through a first pin, the backrest support plate is hinged with the first connector through a second pin, the first connector is hinged with the second connector through a third pin, the second connector is hinged with the third connector through a fourth pin, the second connector is mounted on the seat panel through a twenty-fifth pin, the third connector is hinged with a sixth connector through a fifth pin, the sixth connector is hinged with an eighth connector through a sixth pin, the sixth connector is hinged with the fifth connector through a tenth pin, the fifth connector is hinged with one end of a seventh connector through an eleventh pin, the other end of the seventh connector is hinged with a ninth connector through a twenty-third pin, the eighth connector is hinged with a ninth connector and a tenth connector through a seventh pin, the ninth connector is hinged with a tenth connector through a twenty-fourth pin, the tenth connector is hinged with a front support piece through an eighth pin, the front support piece is hinged with a seat panel through a ninth pin, the eleventh connector is hinged with the leg assembly, the back support piece is hinged with the seat panel through a thirteenth pin, the back support piece is hinged with the eleventh connector through a fourteenth pin, the back support piece is hinged with the tenth connector through a fifteenth pin, one end of the driving device is hinged with the back drive piece, and the back drive piece is fixedly connected to the sixth connector; the other end of the driving device is hinged with the front drive piece, the front drive piece is connected to the leg assembly, and the backrest return spring is installed between the tenth connector and the third connector. This application is through above-mentioned design for the back assembly has reduced the distance between the backrest fixing plate and the back of the back assembly, has improved the seat deeply relatively and the comfort level.

The seat panel is provided with a seat panel main body and a back supporting portion, the backrest support plate is provided with a triangular supporting portion and a backrest upper portion, the angle formed by the connecting line between the center of the first pin and the second pin, as well as the connecting line between the center of the second pin and the center of the third pin, is the backrest drive angle, which is between 70°-93° for drive power high-usage just is difficult to damage. As a specific example, the backrest drive angle is 71° in the sitting state and 92° in the lying state. The included angle between the backrest fixing plate and the seat panel main body is 92°-95°, the included angle between the triangular supporting portion of the backrest support plate and the seat panel main body is 95°-102° in a sitting state, and the included angle between the backrest upper portion and the seat panel main body is 102°-110°, so that the form of relatively stable transition of gradual backward tilting of the whole backrest is formed, and the sitting feeling of a user is improved.

the center of the third pin and the center of the fifth pin relative to the center of the fourth pin is 145°-157°, and this contained angle is close 180 better more, and the pressure that the back receives is conducted to sixth connector more easily, and is relatively less to the spacing pressure of back assembly, is difficult to damage.

The leg assembly comprises a footrest, a first leg link, a second leg link, a third leg link, a fourth leg link, a fifth leg link and a legrest, the third leg link is hinged on the seat panel at one end, one end of the fifth leg link is hinged with the eleventh connector through a twelfth pin, the other end of the third leg link is hinged with the second leg link through a seventh pin the other end of the fifth leg link is hinged with one end of the fourth leg link through an eighteen pin, the fourth leg link is hinged with the third leg link through a sixteenth pin, the other end of the fourth leg link is hinged with the legrest through a nineteenth pin, the legrest is hinged with the first leg link through a twentieth pin, the first leg link is hinged with the footrest through a twenty-first pin, the footrest is hinged with the second leg link through a twenty second pin, the third leg link is fixedly connected to the front drive piece, and the driving device drives the front drive piece to move so as to open or retract the leg assembly.

A leg assembly limit is arranged on the fifth leg link, the leg assembly limit is in fit with the fourth leg link for sitting state, and the leg assembly limit is in fit with the third leg link for the state where the leg assembly are open and the backrest is not open and lying state; a support limit is arranged on the sixth connector, and the support limit and the fifth connector are fit for limiting in the sitting state and the state where the leg assembly are open and the backrest is not open; and the third connector is provided with a back assembly limit, and the back assembly limit and the second connector are fit for limiting in the sitting state and lying state.

The third connector is also equipped with a back assembly lying state limit, which is in contact with the sixth connector during lying state.

Compared with the prior art, the application has the following advantages and effects: the structure is simple, the transformation process between the state where the leg assembly are open and the backrest is not open and the lying state is stable, the seat depth can be relatively improved under the condition that the use space in the front-back direction of the seat is not increased, the structure and the driving are relatively reasonable, the utilization rate of the driving force is high, the damage is not easy to occur, and the service life is long.

The reference signs are:
1—footrest; 2—first leg link; 3—second leg link; 4—legrest; 5—third leg link; 6—fourth leg link; 7—fifth leg link; 71—leg assembly limit; 8—eleventh connector; 9—front support piece; 10—tenth connector; 11—ninth connector; 12—eighth connector; 13—seventh connector; 14—sixth connector; 141—support limit; 15—fifth connector; 16—fourth connector; 17—third connector; 171—back assembly limit; 172—back assembly lying state limit; 18—second connector; 19—first connector; 20—backrest support plate; 21—backrest fixing plate; 22—back support piece; 23—driving device; 24—back drive piece; 25—front drive piece; 26—backrest return spring; 27—seat panel.

A—first pin; B—second pin; C—third pin; D—fourth pin; E—fifth pin; F—sixth pin; G—seventh pin; H—eighth pin; I—ninth pin; J—tenth pin; K—eleventh pin; L—twelfth pin; M—thirteenth Pin; N—fourteenth pin; O—fifteenth pin; P—sixteenth pin; Q—seventeenth pin; R—eighteenth pin; S—nineteen pin; T—twentieth pin; U—twenty—first pin; V—twenty—second pin; W—twenty—third pin; X—twenty—fourth pin; Y—twenty-fifth pin.

DETAILED DESCRIPTION OF THE EMBODIMENTS

The present application will be described in further detail below by way of examples with reference to the accompanying drawings, which are illustrative of the present application and are not intended to limit the present application.

Referring to FIGS. 1 to 7, the narrow backrest electric seat mechanical extension device of the embodiment of the present application mainly includes two mechanical extension units disposed in bilateral symmetry, and a back drive piece 24 and a front drive piece 25 for connecting the two mechanical extension units, each mechanical extension unit mainly includes a leg assembly for extending and retracting the legs, a back assembly for adjusting the posture of the backrest, and a seat panel 27, the present application is mainly improved over the reference document in the design of the back assembly, the back assembly is provided with an eleventh connector 8, a front support piece 9, a tenth connector 10, a ninth connector 11, an eighth connector 12, a seventh connector 13, a sixth connector 14, a fifth connector 15, a fourth connector 16, a third connector 17, a second connector 18, a first connector 19, a backrest support plate 20, a backrest fixing plate 21, a back support piece 22, and a backrest return spring 26, the backrest fixing plate 21 is fixedly connected to the seat panel 27, the backrest support plate 20 is hinged with a backrest fixing plate 21 through a first pin A, the backrest support plate 20 is hinged with a first connector 19 through a second pin B, the first connector 19 is hinged with a second connector 18 through a third pin C, the second connector 18 is hinged with a third connector 17 through a fourth pin D, the second connector 18 is installed on the seat panel 27 through a twenty-fifth pin Y, the third connector 17 is hinged with a sixth connector 14 through a fifth pin E, the sixth connector 14 is hinged with an eighth connector 12 through a sixth pin F, the sixth connector 14 is further hinged with a fifth connector 15 through a tenth pin J, the fifth connector 15 is hinged with one end of a seventh connector 13 through an eleventh pin K, the other end of the seventh connector 13 is hinged with a ninth connector 11 through a twenty-third pin W, the eighth connector 12 is hinged with a ninth connector 11 and a tenth connector 10 through a seventh pin seven G, the ninth connector 11 is hinged with the tenth connector 10 through a twenty-fourth pin X, the eleventh connector 10 is hinged with the front support piece 9 through an eighth pin H, the front support piece 9 is hinged with the seat panel 27 through a ninth pin I, the eleventh connector 8 is hinged with the fifth leg link 7 of the leg assembly through a twelfth pin L, the back support piece 22 is hinged with the seat panel 27 through a thirteenth pin M, the back support piece 22 and the eleventh connector 8 are hinged through a fourteenth pin N, the back support piece 22 is hinged with the eleventh connector 10 through a fifteenth pin O, one end of the driving device 23 is hinged with the back drive piece 24, the back drive piece 24 is fixedly connected to the sixth connector 14, and the state conversion of the back assembly is driven; the other end of the driving device 23 is hinged with a front drive piece 25, the front drive piece 25 is fixedly connected to a third leg link 5 of the two leg assemblies to drive the state conversion of the leg assemblies, and a backrest return spring 26 is arranged between the tenth connector 10 and the third connector 17 to help the back assembly to return. This application is through abovementioned design for the back assembly has reduced the distance between the backrest fixing plate 21 and the back of the back assembly, Save space in front and rear directions, has improved the seat deeply relatively and the comfort level.

Figure 1:
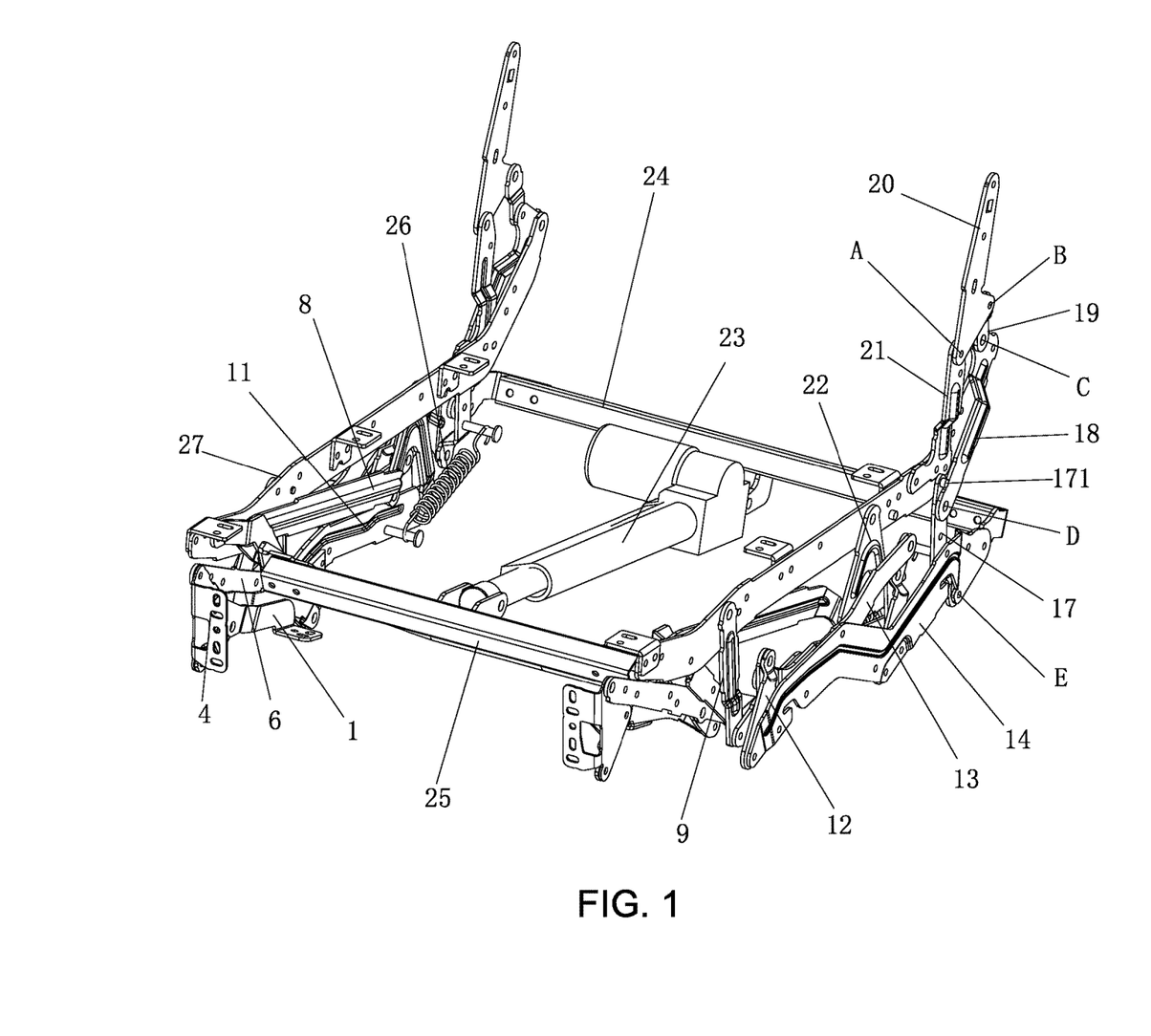
FIG. 1 is a perspective view of an embodiment of the present application.
Figure 2:
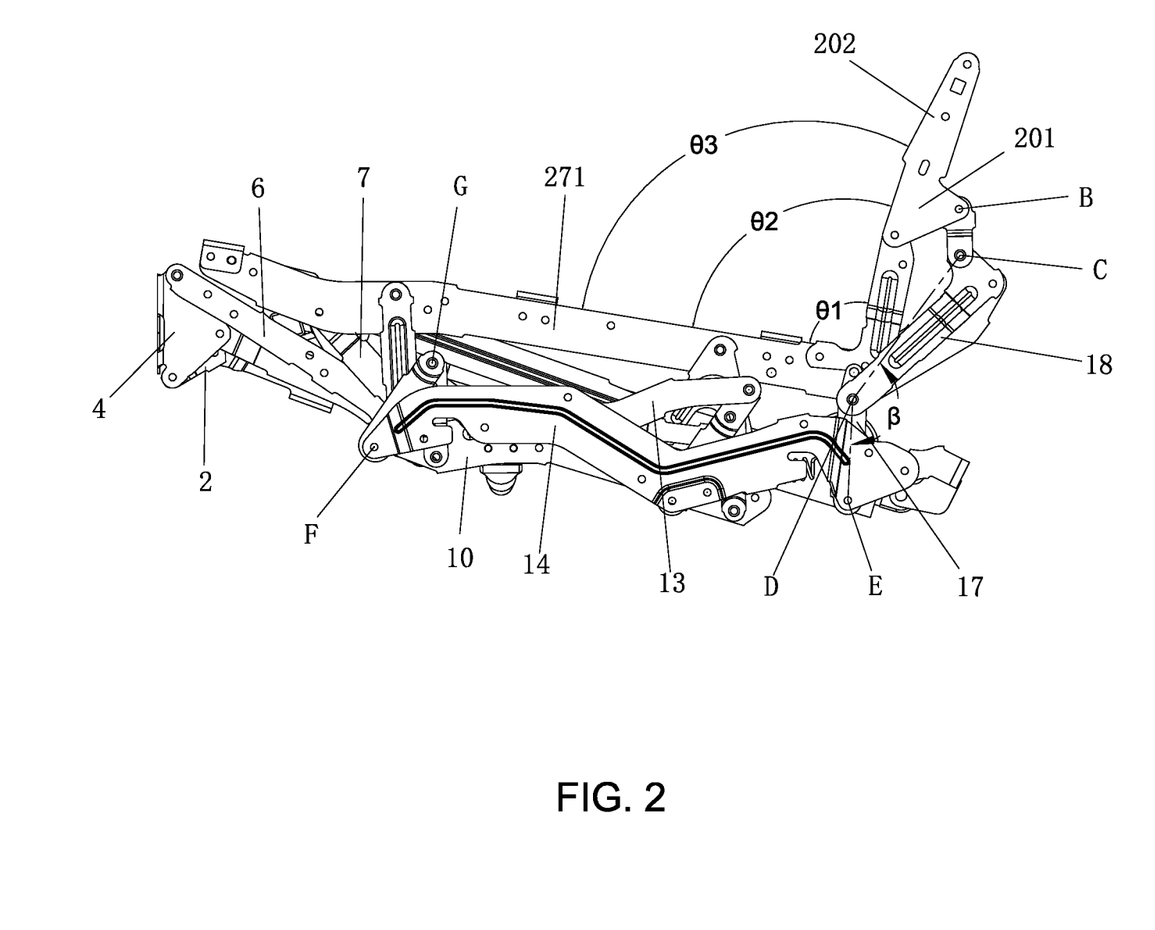
FIG. 2 is a schematic side view of the sitting state of the present application.

Referring to FIG. 2, the seat panel 27 of the present application has a seat panel main body 271 and a back supporting portion 272 of an integral structure, the backrest support plate 20 has a triangular supporting portion 201 and a backrest upper portion 202 of an integral structure, the front side of the backrest fixing plate 21 tilts backward slightly, an included angle θ1 between the backrest fixing plate 21 and the seat panel main body 271 is between 92° and 95°, an included angle θ2 between the triangular supporting portion 201 of the backrest support plate 20 and the seat panel main body 271 is between 95° and 102°, and an included angle θ3 between the backrest upper portion 202 and the seat panel main body 271 is between 102° and 110°, so as to form a relatively smooth transition of the backrest tilting gradually as a whole, and improve the sitting feeling of a user.

Figure 3:
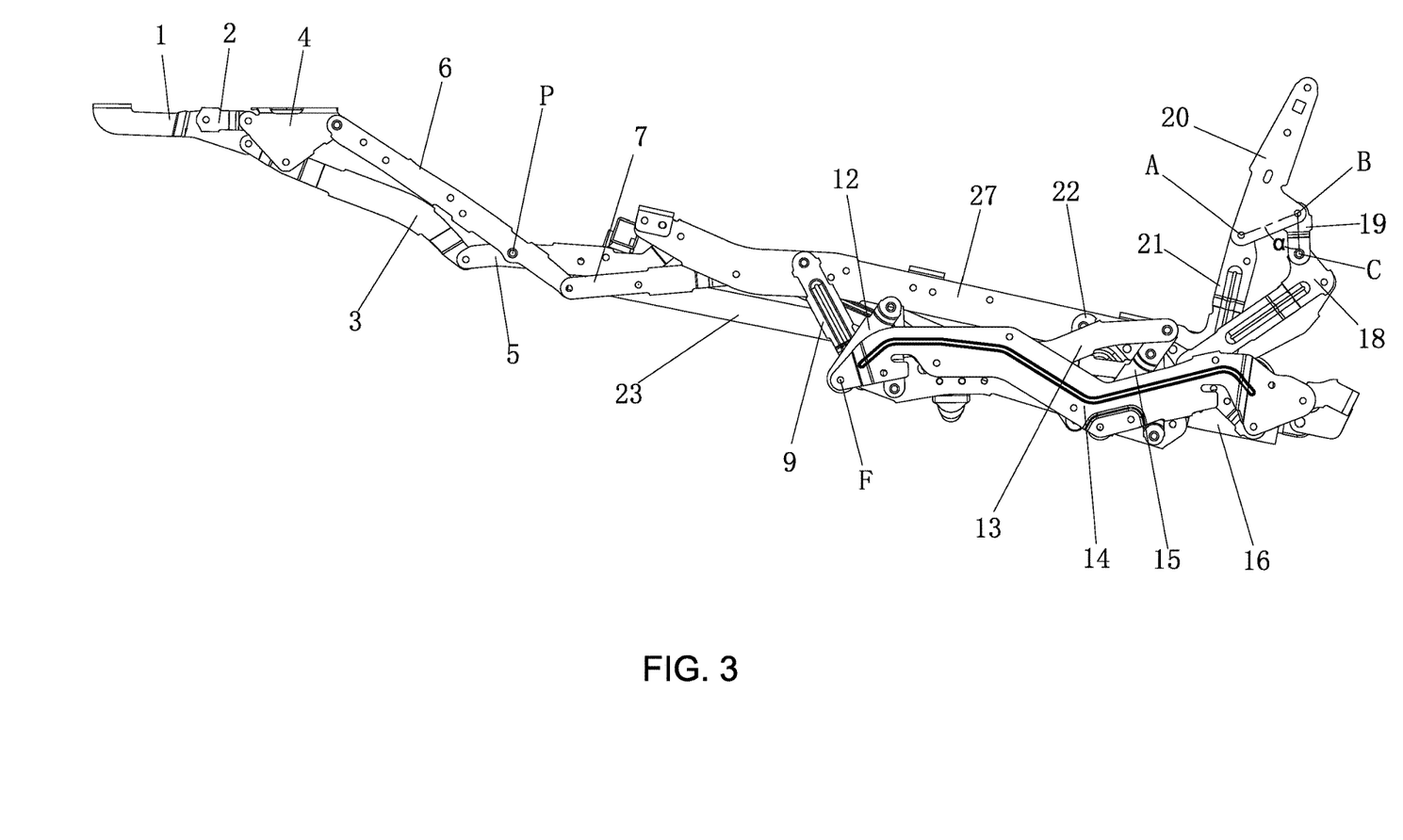
FIG. 3 is a schematic view showing a state where the leg assembly are open and the backrest is not open according to the embodiment of the present application.
Figure 4:
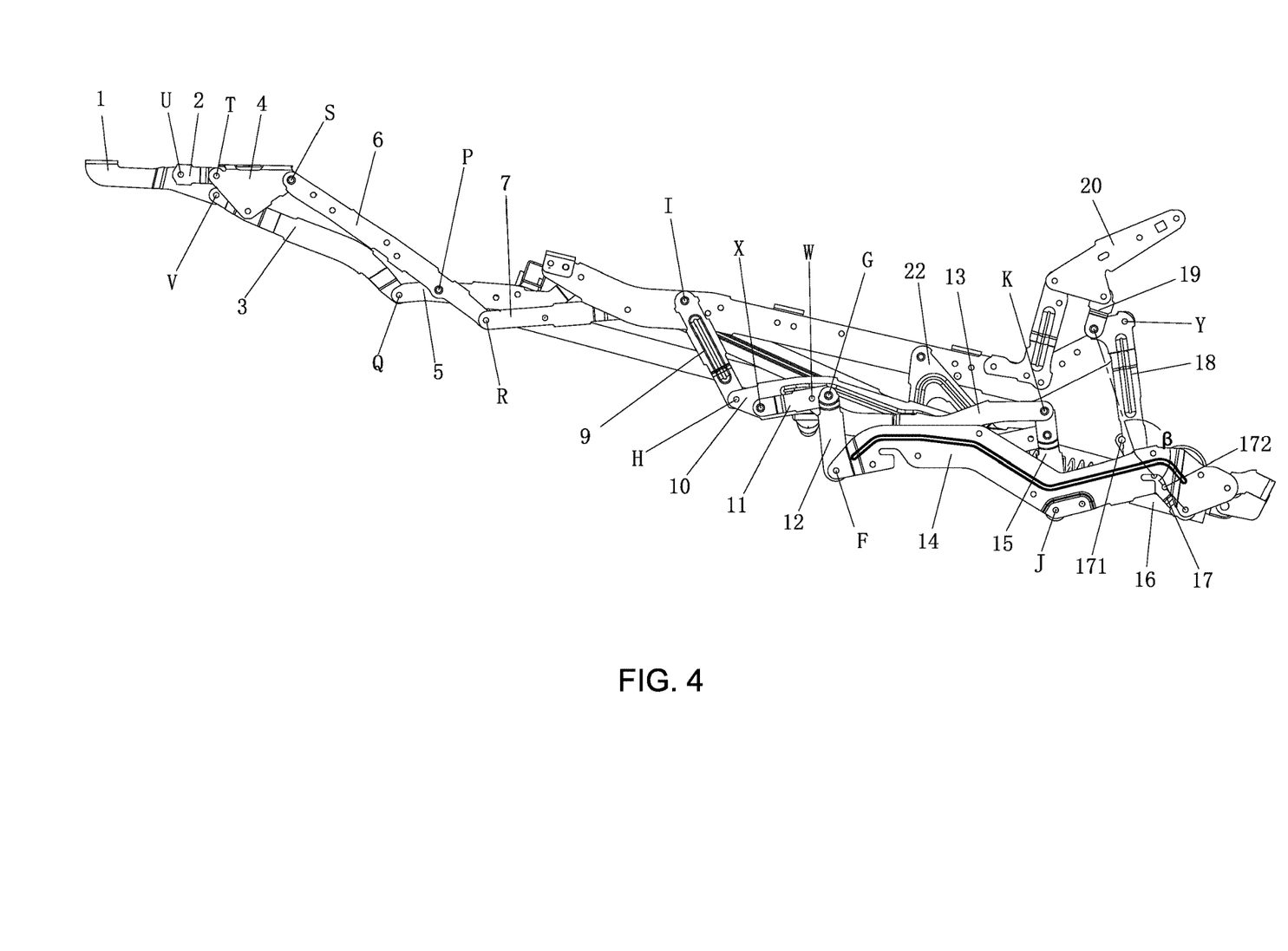
FIG. 4 is a schematic view showing a state in which legs and feet are open and a backrest is open (lying state) according to the embodiment of the present application.
Figure 5:
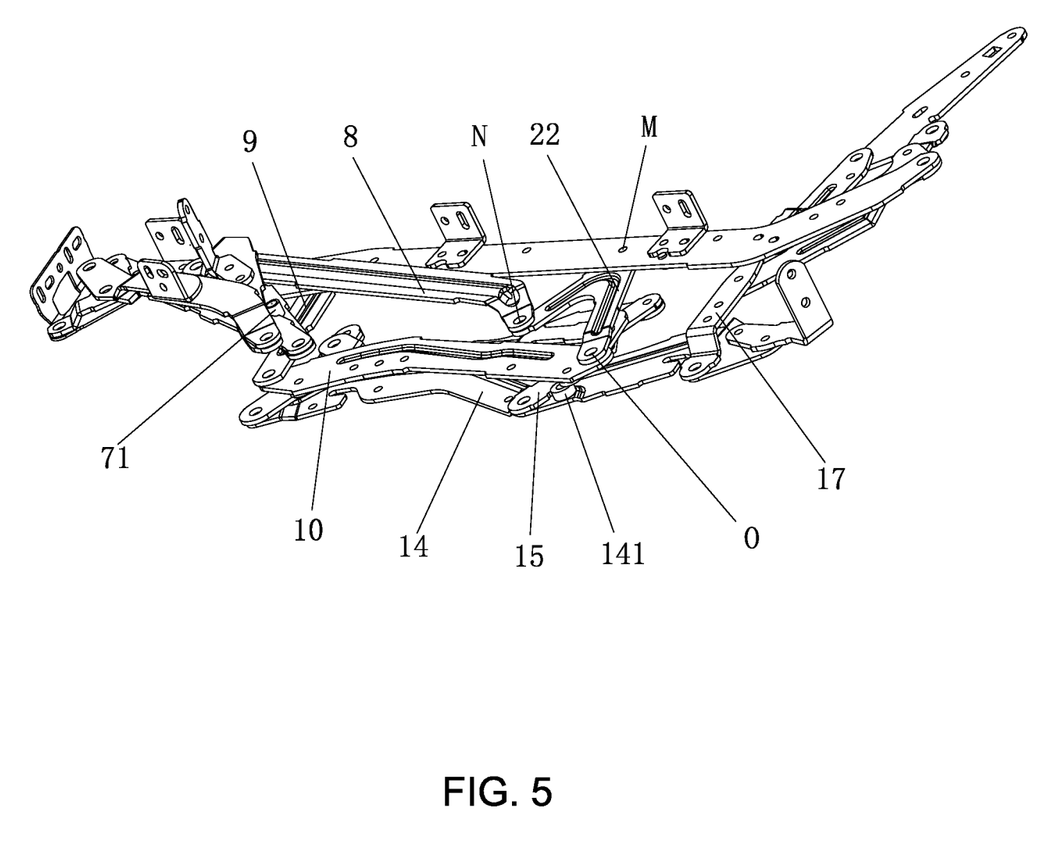
FIG. 5 is a schematic view of an embodiment of a sitting state of the present application.
Figure 6:
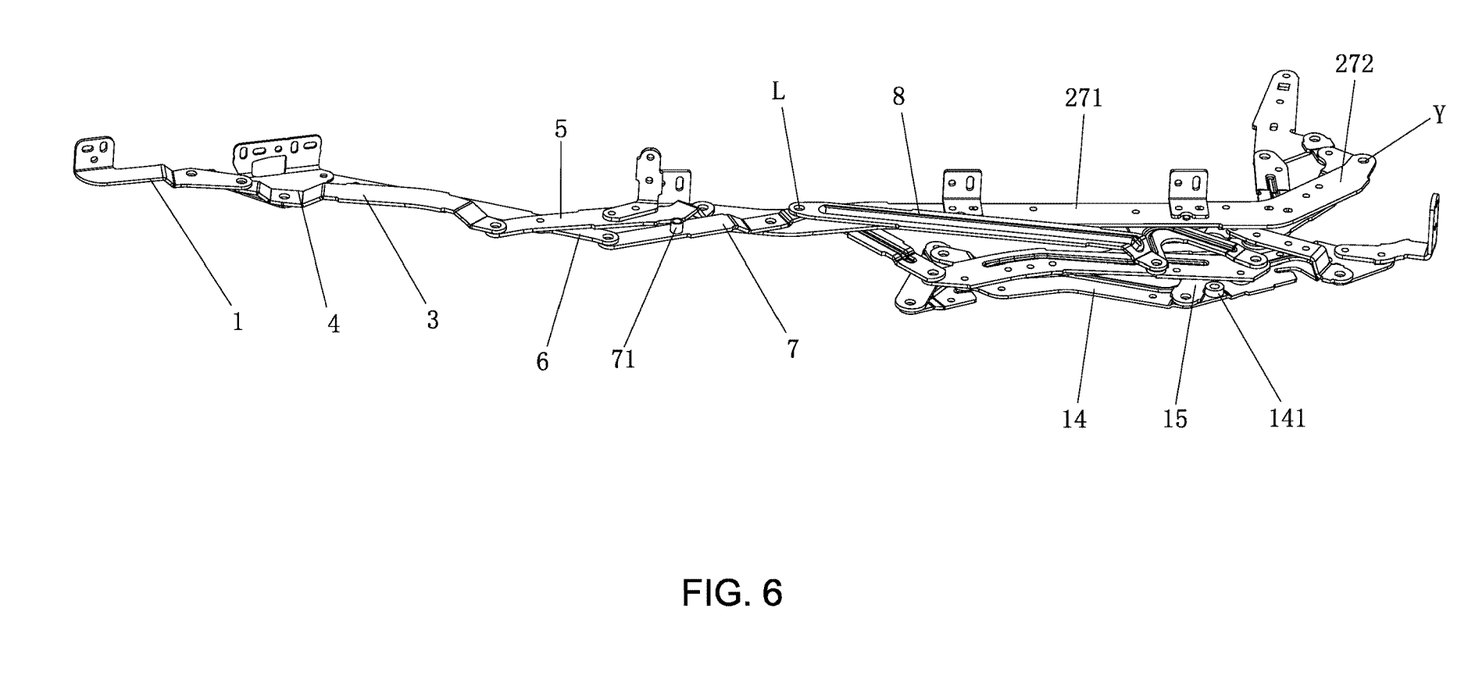
FIG. 6 is a partial perspective view of a state where the leg assembly are open and the backrest is not open according to an embodiment of the present application.
Figure 7:
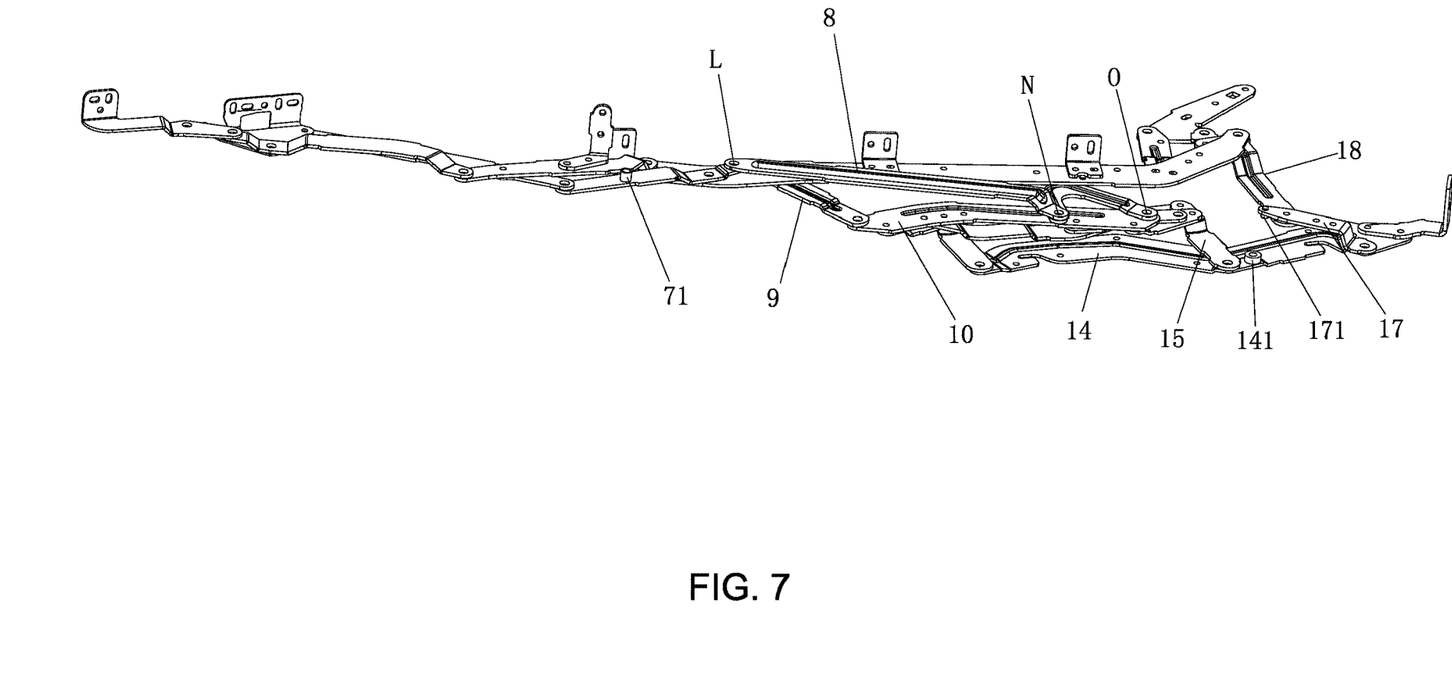
FIG. 7 is a partial perspective view of the lying state in an embodiment of the present application.

Referring to FIGS. 3 and 4, the second pin B is located at the protruding part at the rear end of the triangular supporting portion 201, the influence on the overall strength of the backrest support plate 20 is small, and an included angle between a connecting line between the center of the first pin A and the center of the second pin B and a connecting line between the center of the second pin B and the center of the third pin C is 70-93 degrees of the backrest driving angle α all the time, so that the driving force is high in utilization rate and is not easy to damage (the closer the included angle is to 90 degrees, the better the included angle is). As a specific example, the backrest driving angle α is 71° in the sitting state and 92° in the lying state.

Referring to FIGS. 2 and 4, the second connector 18 is hinged to the third connector 17 through the fourth pin D, an included angle ß formed by the center of the third pin C and the center of the fifth pin E relative to the center of the fourth pin D is 145-157 degrees, the closer the included angle is to 180°, the better the included angle is, the easier the pressure applied to the backrest is to be transmitted to the sixth connector 14, the back assembly limit 171 of the back assembly is relatively small, and the back assembly is not easy to damage. As a specific example, the included angle β is 146° in the sitting state and 156° in the lying state.

The leg assembly comprises a footrest 1, a first leg link2, a second leg link 3, a legrest4, a third leg link 5, a fourth leg link 6 and a fifth leg link7, wherein one end of the third leg link 5 is hinged on a seat panel 27, one end of the fifth leg link7 is hinged with an eleventh connector 8 of the back assembly through a twelfth pin L, the other end of the third leg link 5 is hinged with the second leg link 3 through a seventeenth pin Q, the other end of the fifth leg link7 is hinged with one end of the fourth leg link 6 through an eighteenth pin R, the fourth leg link 6 is hinged with the third leg link 5 through a sixteenth pin P, the other end of the fourth leg link 6 is hinged with the legrest4 through a nineteenth pin S, the legrest4 is hinged with the first leg link2 through a twentieth pin T, the first leg link2 is hinged with the Footrest 1 through a twenty-first pin U, the Footrest 1 is hinged with the second leg link 3 through a twenty-second pin V, the third leg link 5 is fixedly connected to the front drive piece 25, the head of the driving device 23 is hinged with the front drive piece 25, and the leg assembly is opened or retracted by the driving device 23 through driving the front drive piece 25 to move.

The main opening action process of the embodiment is as follows:

the driving device 23 drives the front drive piece 25 to move forward, and drives the other ends of the third leg link 5 of the two leg assemblies connected to the front drive piece 25 to rotate forward, so that the whole leg assembly is driven to unfold forward, and the state shown in FIG. 3 is formed under the constraint that the leg assembly limit 71 on the fifth leg link 7 is attached to the corresponding position of the third leg link 5.

The driving device 23 continues to drive the front drive piece 25 to move forward, the two leg assemblies cannot change the postures under the condition that the leg assembly limit 71 and the third leg link 5 are fitted and limited at the corresponding positions, so that the seat panel 27 is driven to move forward and the rear parts of the two leg assemblies move upward under the restriction of related mechanical fit relation (see the state change of FIGS. 3 to 4), the included angle between the backrest support plate 20 and the seat panel main body 271 is increased, the backrest driving angle α is increased, the included angle β formed by the center of the third pin C and the center of the fifth pin E and the center of the fourth pin D is increased, and when the back assembly limit 171 on the third connector 17 is fitted and corresponds to the position of the second connector 18, the back assembly is adjusted to the lying posture shown in FIG. 4. The third connector 17 can also be provided with the back assembly lying state limit 172, when in lying state, the back assembly lying state limit 172 is attached to the sixth connector 14 to share the limit pressure of a part of the third connector 17, so that the reliability of the equipment is improved.

The furling process is the reverse order process of the opening process, and will not be described in detail, wherein the support limit 141 on the sixth connector 14 is attached to the corresponding position of the fifth connector 15 to play the role of support limit when the lying state is changed to the state where the leg assembly are open and the backrest is not open. When the state where the leg assembly are open and the backrest is not open changes to the sitting state, the support limit 141 is still attached to the corresponding part of the fifth connector 15 to play a role in supporting and limiting; when the leg assembly is folded to the sitting state, the leg assembly limit 71 is attached to the corresponding position of the fourth leg link 6.

The driving device 23 are typically an electric motor, and the sixth connector 14 is mainly fixed to the seat frame and serves as a support for this embodiment.

What is claimed is:

1. A narrow backrest electric seat mechanical extension device, comprises the two mechanical extension units arranged in a bilateral symmetry, a back drive piece, and a front drive piece, wherein each of the two mechanical extension units comprise a leg assembly, a back assembly, and a seat panel, and the back assembly is provided with an eleventh connector, a front support piece, a tenth connector, a ninth connector, an eighth connector, a seventh connector, a sixth connector, a fifth connector, a fourth connector, a third connector, a second connector, a first connector, a backrest support plate, a backrest fixing plate, a back support piece, and a backrest return spring, the backrest fixing plate is fixedly connected to the seat panel, the backrest support plate is hinged with the backrest fixing plate through a first pin, the backrest support plate is hinged with the first connector through a second pin, the first connector is hinged with the second connector through a third pin, the second connector is hinged with the third connector through a fourth pin four, the second connector is mounted on the seat panel through a twenty-fifth pin, the third connector is hinged with the sixth connector through a fifth pin, the sixth connector is hinged with the eighth connector through a sixth pin, the fifth connector is hinged with the seventh connector through an eleventh pin, the seventh connector is hinged with the ninth connector through a twenty-third pin, the eighth connector is hinged with the ninth connector and the tenth connector through a seventh pin, the ninth connector is hinged with the tenth connector through a twenty-fourth pin, the tenth connector is hinged with the front support piece through an eighth pin, the front support piece is hinged with the seat panel through a ninth pin, the eleventh connector is hinged with the leg assembly, the back support piece is hinged with the seat panel through a thirteenth pin, the back support piece and the eleventh connector are hinged through a fourteenth pin, the back support piece is hinged with the tenth connector through a fifteenth pin, a first end of a driving device is hinged with the back drive piece, and the back drive piece is fixedly connected to the sixth connector; a second end of the driving device is hinged with the front drive piece, the front drive piece is connected to the leg assembly, and the backrest return spring is installed between the tenth connector and the third connector.

2. The narrow backrest electric seat mechanical extension device according to claim 1, wherein the seat panel is provided with a seat panel main body and a back supporting portion, the backrest support plate is provided with a triangular supporting portion and a backrest upper portion, the second pin is located at an back end protruding portion of the triangular supporting portion, an included angle formed by a connecting line between a center of the first pin and a center of the second pin and a connecting line between the center of the second pin and a center of the third pin is a backrest driving angle, and the backrest driving angle is 70-93 degrees.

3. The narrow backrest electric seat mechanical extension device according to claim 2, wherein the backrest driving angle is 71 degrees in a sitting state and 92 degrees in a lying state.

4. The narrow backrest electric seat mechanical extension device according to claim 1, wherein an included angle formed by a center of the third pin and a center of the fifth pin relative to a center of the fourth pin is 145-157 degrees.

5. The narrow backrest electric seat mechanical extension device according to claim 4, wherein the included angle is 146 degrees in a sitting state and 156 degrees in a lying state.

6. The narrow backrest electric seat mechanical extension device according to claim 1, wherein the leg assembly comprises a footrest, a first leg link, a second leg link, a legrest, a third leg link, a fourth leg link and a fifth leg link, a first end of the third leg link is hinged to the seat panel, a first end of the fifth leg link is hinged to the eleventh connector through a twelfth pin, a second end of the third leg link is hinged to the second leg link through a seventeenth pin, a second end of the fifth leg link is hinged to a first end of the fourth leg link through an eighteenth pin, the fourth leg link is hinged to the third leg link through a sixteenth pin, a second end of the fourth leg link is hinged to the legrest through a nineteenth pin, the legrest is hinged to the first leg link through a twentieth pin, the first leg link is hinged with the footrest through a twenty-first pin, the footrest is hinged to the second leg link through a twenty-second pin, and the third leg link are fixedly connected to the front drive piece.

7. The narrow backrest electric seat mechanical extension device according to claim 6, wherein a leg assembly limit is arranged on the fifth leg link, the leg assembly limit is in fit with the fourth leg link for a sitting state, and the leg assembly limit is in fit with the third leg link for a state where the leg assembly are open and the backrest is not open and a lying state; a support limit is arranged on the sixth connector, and the support limit and the fifth connector are fit for limiting in the sitting state and the state where the leg assembly are open and the backrest is not open; and the third connector is provided with a back assembly limit, and the back assembly limit and the second connector are fit for limiting in the sitting state and the lying state.

8. The narrow backrest electric seat mechanical extension device according to claim 7, wherein the third connector is further equipped with a back assembly lying state limit, and the back assembly lying state limit is in contact with the sixth connector during the lying state.

9. The narrow backrest electric seat mechanical extension device according to claim 2, wherein an included angle between the backrest fixing plate and the seat panel main body is 92-95 degrees, an included angle between the triangular supporting portion of the backrest support plate and the seat panel main body is 95-102 degrees in a sitting state, and an included angle between the backrest upper portion and the seat panel main body is 102-110 degrees.

\* \* \* \* \*